United States Patent [19] [11] 4,165,338
Katsushima et al. [45] Aug. 21, 1979

[54] 2-HYDROXY-1,1,2,3,3-PENTAHYDRO-PER-FLUOROALKYL DERIVATIVES, THEIR PRODUCTION AND USE

[75] Inventors: Atsuo Katsushima, Higashiosaka; Iwao Hisamoto, Suita; Shoshin Fukui, Toyonaka; Chiaki Maeda, Settsu; Akitoshi Iwatani, Yao; Takahisa Kato, Settsu; Masayuki Nagai, Settsu; Hiroyuki Shinkai, Settsu; Masayuki Asaoka, Kyoto, all of Japan

[73] Assignee: Daikin Kogyo Co., Ltd., Osaka, Japan

[21] Appl. No.: 807,164

[22] Filed: Jun. 16, 1977

Related U.S. Application Data

[60] Continuation-in-part of Ser. No. 538,507, Jan. 6, 1975, Pat. No. 4,084,059, which is a division of Ser. No. 299,741, Oct. 24, 1972, Pat. No. 3,870,748, which is a continuation-in-part of Ser. No. 877,497, Nov. 17, 1969, abandoned.

[30] Foreign Application Priority Data

Nov. 18, 1968 [JP] Japan .................. 43-84276
Dec. 5, 1968 [JP] Japan .................. 43-89252
Dec. 19, 1968 [JP] Japan .................. 43-93513
Dec. 19, 1968 [JP] Japan .................. 43-93514
Feb. 7, 1969 [JP] Japan .................. 44-9524
Mar. 10, 1969 [JP] Japan .................. 44-18411

[51] Int. Cl.² .............. C07C 91/04; C07C 91/06; C07C 91/14; C07C 91/26
[52] U.S. Cl. .............. 260/584 R; 260/563 R; 260/563 C; 260/566 D; 260/567.6 F; 260/570.8 R; 260/570.9; 260/573; 260/584 B; 260/584 C; 560/42; 560/169; 560/170; 560/250
[58] Field of Search .......... 260/584 R, 584 B, 584 C, 260/574, 570.9, 563 C, 566 D, 567.6 F, 573; 560/42, 170

[56] References Cited

U.S. PATENT DOCUMENTS 2,700,686 1/1955 Dickey et al. ............... 260/584 R
3,873,619 3/1975 Foulletier et al. ........... 260/563 C

FOREIGN PATENT DOCUMENTS 1966959 1/1976 Fed. Rep. of Germany ....... 260/584 B

Primary Examiner—Winston A. Douglas
Assistant Examiner—John Doll
Attorney, Agent, or Firm—Bierman & Bierman

[57] ABSTRACT

A compound of the formula:

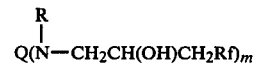

wherein Q is a hydrogen atom, —CH$_2$CH(OH)CH$_2$Rf or a hydrocarbon residue having a valence corresponding to m which may contain one or more of —O—, —COO—, —NH—, —N= and

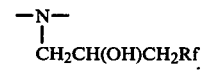

in the chain, R is a hydrogen atom, a hydrocarbon residue or —CH$_2$CH(OH)CH$_2$Rf and m is an integer of not less than 1, Rf being a perfluoroalkyl group, an ω-hydro-perfluoroalkyl group o an ∂-chloro-erfluoroalkylgroup having 4 to 20 carbon atoms, which is useful as an agent for rendering fibrous materials oleophobic and anti-soiling and may be prepared by reacting a perfluoroalkylpropylene oxide of the formula:

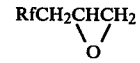

wherein Rf is the same as defined above, with a reagent of the formula:

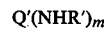

wherein Q' is a hydrogen atom or a hydrocarbon residue having a valence corresponding to m which may contain one or more of —O—, —COO—, —NH— and —N= in the chain, R' is a hydrogen atom or a hydrocarbon residue, and m is the same as defined above.

9 Claims, No Drawings

2-HYDROXY-1,1,2,3,3-PENTAHYDRO-PERFLUOROALKYL DERIVATIVES, THEIR PRODUCTION AND USE

This is a continuation-in-part application of our co-pending application Ser. No. 538,507, filed on Jan. 6, 1975, (now U.S. Pat. No. 4,084,059, issued Apr. 11, 1978) which is a division of Ser. No. 299,741, filed on Oct. 24, 1972 (now patent 3,870,748), which is in turn a continuation-in-part application of Ser. No. 877,497, filed Nov. 17, 1969, now abandoned.

The present invention relates to 2-hydroxy-1,1,2,3,3-pentahydro-perfluoroalkyl derivatives, and their production and use. More particularly, it relates to new and useful 2-hydroxy-1,1,2,3,3-pentahydro-perfluoroalkyl derivatives, to compositions containing the same suitable for treating fibrous materials to render them oleophobic and anti-soiling, and to fabrics and fibers which have been sized or coated with the same so as to have been rendered oleophobic and anti-soiling.

The new compounds of the present invention are representable by the general formula:

  [I]

wherein Q is a hydrogen atom, —CH$_2$CH(OH)CH$_2$Rf or a hydrocarbon residue having a valence corresponding to m which may contain one or more of —O—, —COO—, —NH—, —N= and

in the chain, R is a hydrogen atom, a hydrocarbon residue or —CH$_2$CH(OH)CH$_2$Rf and m is an integer of not less than 1, Rf being a perfluoroalkyl group, an ω-hydroperfluoroalkyl group or an ω-chloro-perfluoroalkyl group having 4 to 20 carbon atoms.

Hitherto, there have been proposed various methods for imparting anti-soiling property to fibrous materials. For instance, fabrics made of hydrophobic synthetic fibers or fabrics processed with a hydrophobic synthetic resin are treated with a solution or suspension of a hydrophilic substance such as polymers having acrylic acid as the unit constituent, polyethylene glycol derivatives and carboxymethyl cellulose so that the soils attached to the fabrics are apt to be eliminated and laundering. This method, however, fails to prevent soil attachment itself. Further, for instance, fabrics are treated with a solution or dispersion of polymers of C$_8$F$_{17}$SO$_2$N(C$_2$H$_5$)CH$_2$CH$_2$OOCH=CH$_2$ or C$_8$H$_{17}$CH$_2$CH$_2$OOCC(CH$_3$)=CH$_2$ or of chromic acid compounds having a polyfluoroalkyl group such as C$_7$F$_{15}$COOCr$_2$(OH)Cl$_4$ to impart oil-repellent property to them whereby the attachment of oily and aqueous stains is prevented. However, it is quite difficult to remove the once attached stains by laundering, and stained parts increase during laundering by adsorption and preservation of soils contained in washings on the surface of the fabrics.

It has now been found that the perfluoroalkyl compounds [I] can impart excellent oil-repellent and anti-soiling properties to fibrous materials treated therewith. Aqueous and oily soils are difficult to attach on the treated fibrous materials and, even if attached, can be readily and completely eliminated by laundering in ordinary manners. Thus, the perfluoroalkyl compounds [I] are useful as oil-repellent agents and anti-soiling agents. In addition, they are useful as plasticizers and also as intermediates for fluorine-containing polyurethanes.

The perfluoroalkyl compounds [I] can be produced by reacting a perfluoroalkylpropylene oxide of the formula:

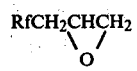  [II]

wherein Rf is as defined above with a reagent of the formula:

Q'(NHR')$_m$  [III]

wherein Q' is a hydrogen atom or a hydrocarbon residue having a valence corresponding to m which may contain one or more of —O—, —COO—, —NH— and —N= in the chain, R' is a hydrogen atom or a hydrocarbon residue and m is as defined above.

Examples of the hydrocarbon residue represented by Q' in the formula [III] are alkyl, aralkyl, cycloalkyl, aryl, alkylaryl, alkenyl, etc. These groups may optionally have an oxyalkylene chain therein. Examples of the hydrocarbon residue represented by R' include lower alkyl such as methyl, ethyl or propyl.

The expoxide [II] may be prepared, for instance, by adding radically a perfluoroalkyl iodide of the formula: RfI wherein Rf is as defined above to allyl alcohol and treating the resultant alcohol of the formula: RfCH$_2$CHICH$_2$OH wherein Rf is as defined above with an alkali hydroxide (e.g. sodium hydroxide, potassium hydroxide) in water to eliminate hydrogen iodide therefrom. Examples of the epoxide [II] are as follows:

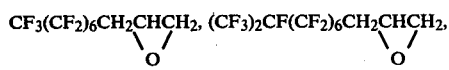

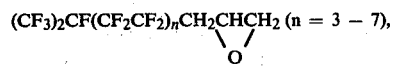

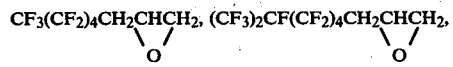

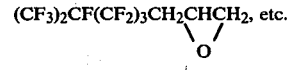

As the reagent [III], there may be employed primary amines, secondary amines or ammonia.

Examples of the primary amine and the secondary amine are ethylamine, diethylamine, propylenediamine, hexamethylenediamine, pentaethylenehexamine, melamine, octadecylamine, hexamethylenetetramine, aniline, diethylenetriamine, triethylenetetramine, cyclohexylamine, benzylamine, benzylaniline and an amine containing a polyethylene oxide chain of the formula: R"HNR'O(CH$_2$CH$_2$O)$_p$R'NHR" wherein R" is a hydrogen atom or an alkyl group and R' and n are each as defined above (e.g. H$_2$N(CH$_2$)$_3$O(CH$_2$CH$_2$O)-$_n$—(CH$_2$)$_3$NH$_2$, C$_2$H$_5$NH(CH$_2$)$_3$O(CH$_2$C-H$_2$O)$_n$(CH$_2$)$_3$NHC$_2$H$_5$, CH$_3$NH—(CH$_2$)$_3$O(CH$_2$C-H$_2$O)$_n$(CH$_2$)$_3$NHCH$_3$,

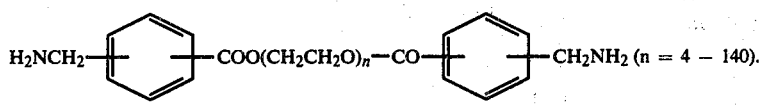 (n = 4 – 140).

The reaction between the epoxide [II] and the primary amine [III] proceeds as follows:

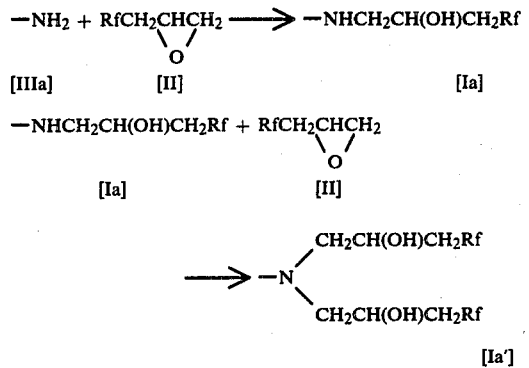

Thus, the reaction of the epoxide [II] with the primary amine [IIIa] in equimolar amounts affords the secondary amine [Ia] and, when the epoxide [II] is employed in two molar amount to one molar amount of the primary amine [IIIa], there is obtained the tertiary amine [Ia']. The reaction between the epoxide [II] and the secondary amine [IIIb] is represented by the formulae:

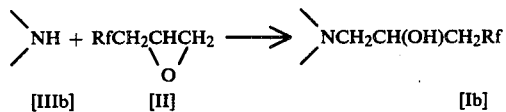

In place of the primary amine [IIIa] or the secondary amine [IIIb], there may be used ammonia [IIIc], which is reacted with the epoxide [II] as follows:

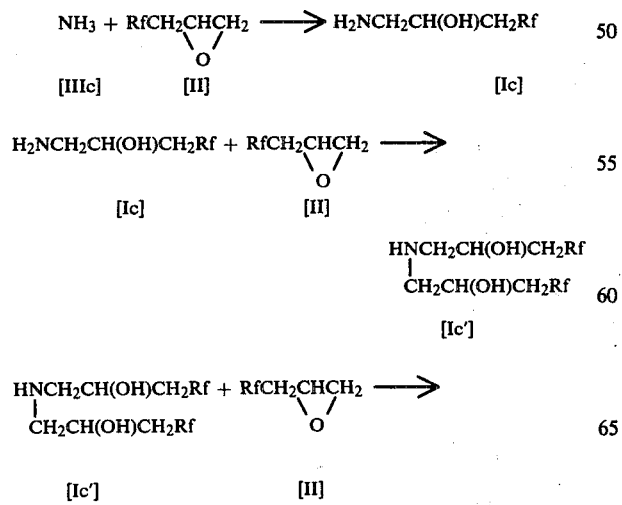

All the above reactions are usually effected by treating the epoxide [II] with the primary amine [IIIa], the secondary amine [IIIb] or ammonia [IIIc] in a slightly excess amount at a temperature of from 30° to 150° C., preferably from 80° to 100° C. The use of a solvent is not always needed. If employed, the use of an inert organic solvent such as fluoroalkanes is recommended for controlling the elevation of temperature caused by generation of heat. In general, the presence of water in the reaction system is unfavorable, and its amount should be suppressed not more than 10% by weight. The reactions can be promoted by the use of a tertiary amine (e.g. triethylamine). The reactions are normally completed in 30 minutes to 10 hours to give the perfluoroalkyl compound [Ia]-[Ic"] in nearly quantitative yields. The thus obtained perfluoroalkyl compound [Ia]-[Ic"] may be further converted into its acid addition salt by treatment of the former with an organic or inorganic acid usually at a temperature from room temperature to 100° C., if desired, in an inert organic solvent such as fluoroalkanes. This conversion is advantageously carried out immediately after completion of the reaction between the epoxide [II] and the primary amine [IIIa], the secondary amine [IIIb] or ammonia [IIIc], i.e. without the isolation of the produced perfluoroalkyl compound [Ia]-[Ic"] from the reaction mixture. The perfluoroalkyl compound [Ia]-[Ic"] itself is a liquid or solid which is insoluble in water, whereas most of its acid addition salts are soluble in water. Both are utilizable for the object of this invention.

The produced perfluoroalkyl compound [Ia]-[Ic"] is fallen in one of the following formulae:

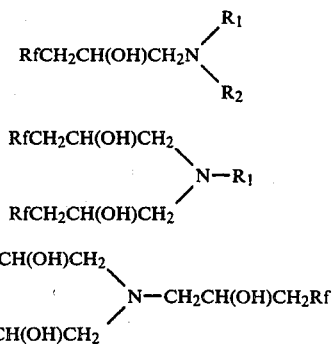

wherein $R_1$ and $R_2$ are each a hydrogen atom or a hydrocarbon group bearing or not one or more substituents. Specific examples are as follows:

$CF_3(CF_2)_6CH_2CH(OH)CH_2N(C_2H_5)_2$

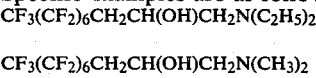

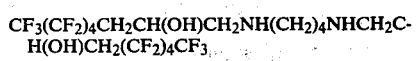

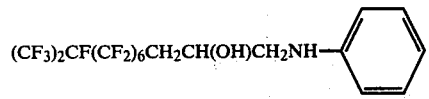

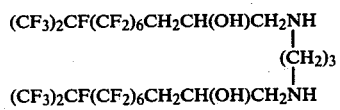

The condensate of

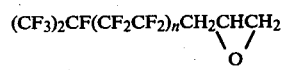

(n=3-7) with diethylenetriamine

As stated above, the perfluoroalkyl compounds [I] (including the acid addition salts) have oleophobic and anti-soiling properties. Based on such properties, they are used for treatment of fibrous materials.

On treating fibrous materials with the perfluoroalkyl compound [I] (including the acid addition salt), the active ingredient is dissolved or dispersed in a suitable solvent to make a concentration of 0.05 to 5% by weight, the fibrous materials are immersed therein and the wet materials are dried in atmosphere or while heating at 80° to 150° C. for 30 seconds to 10 minutes.

As the solvent, the use of an organic solvent having a boiling point from 30° to 150° C., particularly from 35° to 100° C., is preferred. Specific examples of such organic solvent are fluoroalkanes (e.g. trichlorotrifluoroethane, dichlorotetrafluoroethane), ketones (e.g. acetone, methyl ethyl ketone), esters (e.g. ethyl acetate), fluorine-containing cyclic compounds (e.g. benzotrifluoride), etc. For dilution of these solvents, there may be also used benzene, petroleum ether, xylene or the like.

From the economical viewpoint, it is advantageous to make up an aqueous dispersion. Thus, the active ingredient is dispersed in water in the presence of an appropriate emulsifier by conventional operations. Examples of the emulsifier are anionic surfactants (e.g. sodium dodecylbenzenesulfonate, $C_7F_{15}COONa$), non-ionic surfactants (e.g. polyoxyethylenealkyl phenyl ether, polyoxyethylene amyl ester, sorbitan fatty acid ester), cationic surfactants (e.g. quaternary ammonium salts), etc.

The textile fabrics treated with the anti-soiling treatments of this invention are quite excellent in repellency to stains, stain-removing actions, prevention of soil redeposition during laundering and durability to laundering and show very favorable appearance.

The perfluoroalkyl compound [I] (including the acid addition salt) is also used for the separation of water and oil (e.g. kerosene, sesame oil, heavy oil, machine oil, watch oil, refrigerator oil, hexane, heptane, octane, cyclohexane) from their mixture. For instance, porous materials such as paper, woven fabric, non-woven fabric and asbestos are treated with the active ingredient dissolved or dispersed in water or organic solvents, if necessary, by the aid of surfactants so that the porous materials are imparted oil-repellency and allows only the passing of water therethrough.

The perfluoroalkyl compound [I] (including the acid addition salt) may be also employed in combination with any water-phobic agent. In such case, the materials treated with them are imparted both oil-repellency and water-repellency. Examples of the water-phobic agent are the polymers of the fluorine-containing vinylcarboxylic esters of the formula: $RfCH_2CH(OH)CH_2OOCCR_3=CH_2$ where $R_3$ is a hydrogen atom or a methyl group. The vinylcarboxylic esters may be produced, for instance, by reacting the epoxide of the formula:

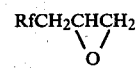

or the diol of the formula: $RfCH_2CH(OH)CH_2OH$ with acrylic acid or methacrylic acid. The ratio by weight of the perfluoroalkyl compound [I] and the vinylcarboxylic ester is 9:1–1:9, favorably 5:1–1:5. On treatment, these active ingredients are employed in the form of solution or dispersion in water or organic solvents, if necessary, by the aid of surfactants.

In addition to the above uses, the perfluoroalkyl compound [I] (including the acid addition salt) may be used as plasticizers or intermediates for the synthesis of polyurethanes. For instance, the amine of the formula: $[RfCH_2CH(OH)CH_2NH]_2A$ wherein A is a hydrocarbon group bearing or not one or more substituents or its mixture with an active hydrogen-containing material such as ethyleneglycol adipate, propyleneglycol adipate, condensates of ω-hydroxyhexanoate or glycerol adipate is polymerized with a diisocyanate of the formula: OCNA'NCO wherein A' is a hydrocarbon group (e.g. 2,4- or 2,6-tolylenediisocyanate, 3,3'-bitolylene-4,4'-diisocyanate, diphenylmethane-4,4'-diisocyanate, 3,3'-dimethyldiphenylmethane-4,4'-diisocyanate, metaphenylenediisocyanate, triphenylmethanetriisocyanate, 2,4-tolylenediisocyanate dimer, hexamethylenediisocyanate, naphthylene-1,5-diisocyanate). The polymerization is effected at a temperature from room temperature to 150° C., preferably in the presence of a small amount of a catalytic substance (e.g. ethylenediamine, triethylamine, triethylenediamine, dimethylethanolamine, bis(diethylethanolamine) adipate, N,N-dimethylcyclohexylamine, dibutyl tin laurate, dibutyl tin di(2-ethylhexoate), stannous 2-ethylcaproate, stannous oleate). The ratio of the perfluoroalkyl compound [I] and the diisocyanate to be used may be appropriately decided on the kind of the polyurethane to be required. The thus obtained polyurethane has oleophobic and anti-soiling properties and possesses a wide variety of uses, e.g. the use as coating materials, the use as additives to painting, etc.

Practical and presently preferred embodiments of the invention are illustratively shown in the following Examples. In these Examples, parts and percent are by weight unless otherwise indicated. Further, various properties such as water-repellency, oil-repellency, stain-removability and anti-soil redeposition in the following examples are determined by the methods as described below:

1. Water-repellency

Measurement is effected according to A.A.T.C.C. Standard Test Method 22-1952.

2. Oil-repellency

Measurement is effected according to A.A.T.C.C. Standard Test Method 118-1966Y.

3. Stain removability

A test cloth is put on a blotting paper extended evenly, and 5 drops of liquid paraffin in admixture with purple dye "Waxoline Purple AS" (manufactured by I.C.I., England) are added dropwise onto one place of the test cloth, which is covered with a polyethylene film. The test cloth is pressed by 2.27 kg of poise for a minute, which is removed. The excess of the liquid paraffin is wiped off with a cotton cloth. The test cloth is allowed to stand for 12 hours and laundered.

Laundering is effected with a drum side-rolling automatic washing machine (manufactured by Sakata Kiko Co., Ltd.). To cloths (300 g) including the test cloth, there are added water (15 L) warmed at 45° C. and a conventional cleaning material (e.g. "Kao Big" (made by Kao Soap Co., Ltd.)) (38 g). The resultant mixture is laundered for 10 minutes and washed with water for 2 minutes three times. Liquid paraffin-removing degrees are judged by the decolored degree of the purple color. Standard of the decolorization is as follows: same color as that of unlaundered cloth: 1.0; completely decolored case: 5.0; grades between them are judged respectively.

4. Anti-Soil redeposition

Soil redeposition bath (150 ml) having the composition as defined in the following table is adjusted, stirred at 50° C. well, and 6 sheets of test cloth (6×6 cm) and 15 steel balls are added to the bath. Soiling of the test cloth is effected by turning Launder-O-Meter at 50° C. for 20 minutes. The soiled cloth is washed with water for 10 minutes and air-dried.

The reflectance of the test cloth is measured by using a photometer and the rate of soil redeposition is calculated by the following equation:

$$\text{Rate of soil redeposition} = \frac{\text{Reflectance of unsoiled cloth} - \text{Reflectance of soiled cloth}}{\text{Reflectance of unsoiled cloth}} \times 100$$

| Composition of soil redeposition bath (%, by weight) | |
|---|---|
| Cleaning material (0.18 %) | |
| Sodium dodecylbenzenesulfonate | 0.045 |
| Sodium tripolyphosphate | 0.045 |
| Sodium sulfate | 0.09 |
| Particulate soil (0.722%) | |
| Carbon black HAF "Shoblack-O" (made by Showa Denko K.K.) | 0.0144 |
| Ferric oxide | 0.0036 |
| Iron Oxide "Yellow 920" (made by Bayer A.G.) | 0.0072 |
| Cellulose powder | 0.144 |
| Bentonite (clay) | 0.552 |
| Fatty soil (0.063%) | |
| Stearic acid | 0.0052 |
| Oelic acid | 0.0052 |
| Triolein | 0.0052 |
| Tristearin | 0.0052 |
| Stearyl alcohol | 0.0052 |
| Oleyl alcohol | 0.0052 |
| Solid paraffin (M.P. 58° to 60° C.) | 0.0104 |
| Cholesterol | 0.0010 |
| Sodium chloride | 0.0208 |

EXAMPLE 1

In a 300 ml volume flask equipped with a thermometer, a cooler and a stirrer,

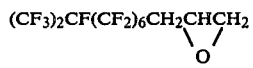

(100 g, 0.18 mol) and diethylamine (14.6 g, 0.20 mol) are charged, and the mixture is stirred at 100° C. for 3 hours. The resultant viscous liquid is distilled under reduced pressure to give as the fraction (101 g) boiling at 85° to 88° C/0.3 mmHg the tertiary amine of the formula:

Elementary analysis. Calcd.: C, 32.05%; H, 2.67%; F, 60.27%; N, 2.34%. Found: C, 32.60%; H, 2.55%; F, 60.5%; N, 2.4%.

The tertiary amine (1 g) is dissolved in acetone (100 ml), and a broad cloth made of polyethylene terephthalate fiber and cotton fiber is immersed therein and dried. The resultant cloth shows 70 in water-repellency and 6 in oil repellency.

The above prepared tertiary amine (20 g) and acetic acid (6 g) are put in a 50 ml volume beaker, and the resulting mixture is stirred at 40° C. for 10 minutes. By the infrared absorption spectrum and the elementary analysis, the production of the acetate of the said tertiary amine is confirmed.

The acetate is dissolved in water to make 1% aqueous solution. A broad fabric made of polyethylene terephthalate fiber and cotton fiber is immersed in the solution, squeezed to give a pick-up of 100%, dried at 80° C. for 10 minutes and then heated at 150° C. for 5 minutes. The cloth shows 70 in water-repellency and 6 in oil-repellency.

EXAMPLE 2

In a 200 ml volume flask equipped with a thermometer, a stirrer and a cooler,

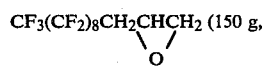 (150 g, 0.28 mol), $CH_3(CH_2)_{17}NH_2$ (38.2 g, 0.14 mol) and triethylamine (2 g) are charged, and the resultant mixture is stirred at 100° to 115° C. for 5 hours. After removal of triethylamine under reduced pressure, the resultant pale brown solid (183 g) is recrystallized from benzene to give the tertiary amine of the formula:

Elementary analysis. Calcd.: C, 37.99%; H, 3.69%; F, 54.40%; N, 1.05%. Found: C, 38.2%; H, 3.6%; F, 53.9%; N, 1.1%.

The tertiary amine (1 g) is dissolved in a mixture of trichlorotrifluoroethane (90 ml) and acetone (10 ml). A cloth made of polyethylene terephthalate fiber and cotton fiber is immersed in the solution and dried. The cloth shows 90 in water-repellency and 7 in oil-repellency.

EXAMPLE 3

In a 1000 mol volume flask equipped with a thermometer, a stirrer and a cooler,

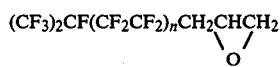

[n=3 - 7; consisting of 52% of the compound (n=3), 25% of the compound (n=4), 14% of the compound (n=5), 6% of the compound (n=6) and 3% of the compound (n=7)](300 g, 0.51 mol), pentaethylenehexamine (13.5 g, 0.057 mol) and difluorotetrachloroethane (400 g) are changed, and the mixture is stirred at 95° to 110° C. for 8 hours. After removal of difluorotetrachloroethane by distillation under reduced pressure, there is obtained the condensate as pale brown, hard solid (311 g).

|  | Oil-repellency | Stoin removability | Anti-soil redeposition |
| --- | --- | --- | --- |
| Before laundering | 7 | 5 | 10 |
| After laundering | 6 | 4.5 | 8.5 |

EXAMPLE 4

As in Example 3, $H_2NCH_2CH_2CH_2O(CH_2CH_2O)_nCH_2CH_2CH_2NH_2$ (n=3–140; average molecular weight, 290) (32 g) and

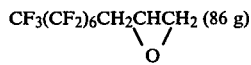

are reacted at 90° C. for 25 hours. The yellowish brown product is washed with water to give the condensate.

The condensate is treated in a homogenizer as in Example 3 to give an emulsion having a solid concentration of 35%. The emulsion is diluted so as to make 0.75% concentration, and a cloth made of polyethylene terephthalate and rayon (80:20) is immersed and dried. The oil-repellency, stain removability and anti-soil redeposition of the cloth are shown in the following table:

|  | Oil-repellency | Stain removability | Anti-soil redeposition |
| --- | --- | --- | --- |
| Before laundering | 7 | 5 | 11 |
| After laundering | 5 | 4 | 9 |

EXAMPLE 5

The condensate (86.5 parts) obtained in Example 4 and acetic acid (13.5 parts) are dissolved in water to make a solid concentration of 0.75 g per 100 ml. Fabrics made of polyethylene terephthalate fiber and polycapramide fiber are immersed in the solution, dried and heated at 150° C. for 5 minutes. The oil-repellency, stain removability and anti-soil redeposition of the fabrics are shown in the following table:

|  |  | Oil-repellency | Stain removability | Anti-soil redeposition |
| --- | --- | --- | --- | --- |
| Polyethylene terephthalate fabric | Before laundering | 7 | 5 | 9 |
|  | After laundering | 7 | 4 | 8 |
| Polycapramide fabric | Before laundering | 7 | 4.5 | 9 |
|  | After laundering | 6 | 4 | 8 |

EXAMPLE 6

Into a 300 ml volume flask equipped with a thermometer, a reflux condenser and a stirrer, there are charged

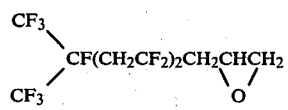

(42.6 g; 0.1 mol) and 10% ethanolic solution of $NH_3$ (18.7 g; 1.1 mol), and the mixture is stirred at 60° C. for 2 hours. Removal of the ethanol and $NH_3$ by distillation under reduced pressure affords a pale brown, slightly viscous solid (43.0 g), which is recrystallized from benzene to give

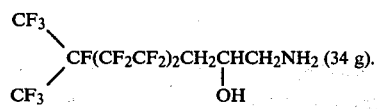

This product (1 g) is dissolved in acetone (100 ml), and the resultant solution is subjected to the tests for water-repellency and oil-repellency as in Example 1. As the result, it is confirmed that it shows 50 in water-repellency and 5 in oil-repellency.

EXAMPLE 7

Into a 300 ml volume flask equipped with a thermometer, a stirrer and a reflux condenser, there are charged

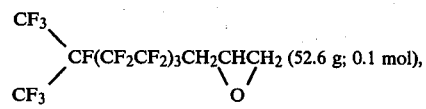

aniline (46.6 g; 0.5 mol) and methanol (100 g), and the resultant mixture is stirred at 60° C. for 15 hours. The reaction mixture is treated as in Example 6 to give a white solid (48 g). By IR absorption spectrum and elementary analysis, this product is confirmed to have the following formula:

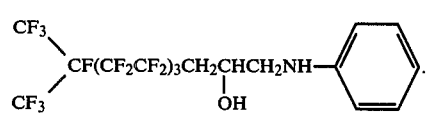

This compound (1 g) is dissolved in trichlorotrifluoroethane (100 ml), and a taffeta fabric made of polyester is immersed therein, squeezed and dried in atmosphere.

The resultant fabric shows 80 in water-repellency and 6 in oil-repellency when tested as in Example 1.

EXAMPLE 8

As in Example 7,

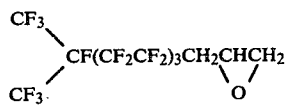

(52.6 g; 0.1 mol) is reacted with cyclohexylamine (50 g; 0.5 mol) to give an amine of the formula:

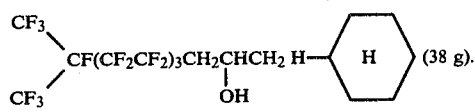

When tested as in Example 7, the product shows 80 in water-repellency and 6 in oil-repellency.

EXAMPLE 9

Into a 300 ml volume flask equipped with a thermometer, a stirrer and a reflux condenser, there are charged

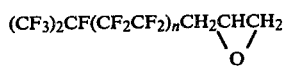

[n=3-7; consisting of 52% of the compound (n=3), 25% of the compound (n=4), 14% of the compound (n=5), 6% of the compound (n=6) and 3% of the compound (n=7)](147 g; 0.25 mol) and melamine (12.6 g; 0.1 mol) are charged, and the resultant mixture is stirred at 100° to 110° C. for 13 hours, whereby the reaction mixture is made uniform and the viscosity is raised. Then, the reaction mixture is allowed to stand at room temperature to give a fluorine-containing polyamine compound (140 g) as a pale brown solid. This product (1 g) is dissolved in a mixture of trichlorotrifluoroethane and acetone (80:20 by weight), and the resultant solution is tested as in Example 7 to show 90 in water-repellency and 7 in oil-repellency.

What is claimed is:

1. A compound of the formula:

wherein Q is a hydrogen atom, —$CH_2CH(OH)CH_2Rf$ or a hydrocarbon residue having a valence corresponding to m which may contain one or more of —O—, —COO—, —NH—, —N= and

in the chain, R is a hydrogen atom, a hydrocarbon residue or —$CH_2CH(OH)CH_2Rf$ and m is an integer of not less than 1, Rf being a perfluoroalkyl group, an ω-hydro-perfluoroalkyl group or an ω-chloro-perfluoroalkyl group having 4 to 20 carbon atoms.

2. A quaternary ammonium salt of a compound of claim 1 with an organic or inorganic acid.

3. The compound according to claim 1 having the formula:

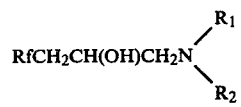

wherein $R_1$ and $R_2$ are each a hydrogen atom, —$CH_2CH(OH)CH_2Rf$ or a hydrocarbon residue, Rf being a perfluoroalkyl group, an ω-hydro-perfluoroalkyl group or an ω-chloro-perfluoroalkyl group having 4 to 20 carbon atoms.

4. The compound according to claim 3, wherein $R_1$ and $R_2$ are each a hydrogen atom or a hydrocarbon residue.

5. The compound according to claim 3, wherein $R_1$ is a hydrogen atom or a hydrocarbon residue and $R_2$ is —$CH_2CH(OH)$ - $CH_2Rf$.

6. The compound according to claim 3, wherein $R_1$ and $R_2$ are each —$CH_2CH(OH)CH_2Rf$.

7. The compound according to claim 3, wherein $R_1$ and $R_2$ are each a hydrogen atom.

8. The compound according to claim 3, wherein $R_1$ is a hydrogen atom and $R_2$ is —$CH_2CH(OH)CH_2Rf$.

9. The compound of claim 3, wherein said hydrocarbon residue is selected from the group consisting of alkyl, aralkyl, cycloalkyl, aryl, alkylaryl, and alkenyl.

* * * * *